United States Patent [19]

Mahoney et al.

[11] Patent Number: 5,207,848
[45] Date of Patent: May 4, 1993

[54] METHOD OF FABRICATING FIBER REINFORCED METAL TUBES

[75] Inventors: Murray W. Mahoney, Camarillo; Milan G. Metcalf, Lakeview Terrace, both of Calif.

[73] Assignee: Rockwell International Corporation, Seal Beach, Calif.

[21] Appl. No.: 423,086

[22] Filed: Oct. 18, 1989

[51] Int. Cl.⁵ .......................................... B32B 31/00
[52] U.S. Cl. .................................. 156/172; 156/293; 156/294; 156/87; 156/286
[58] Field of Search ............... 156/171, 172, 182, 293, 156/294, 187, 188, 191, 194

[56] References Cited

U.S. PATENT DOCUMENTS

| | | | |
|---|---|---|---|
| 3,661,670 | 5/1972 | Pierpont | 156/293 |
| 4,124,922 | 11/1978 | Kusano | 156/294 |
| 4,211,589 | 7/1980 | Fisher et al. | 156/172 |
| 4,348,247 | 9/1982 | Loyd et al. | 156/294 |
| 4,549,919 | 10/1985 | Auberon et al. | 156/172 |
| 4,729,806 | 3/1988 | Stein | 156/172 |

FOREIGN PATENT DOCUMENTS

| | | | |
|---|---|---|---|
| 0225954 | 8/1985 | Fed. Rep. of Germany | 156/293 |
| 3502603 | 7/1986 | Fed. Rep. of Germany | 156/293 |
| 0240798 | 11/1988 | Fed. Rep. of Germany | 156/173 |

Primary Examiner—Donald P. Walsh
Assistant Examiner—Daniel Jenkins
Attorney, Agent, or Firm—John C. McFarren

[57] ABSTRACT

A method is provided for fabricating a fiber reinforced metal tube. A first, thin walled metal tube, such as a copper tube, is wrapped with layers of reinforcing fibers, such as copper coated graphite fibers. Layers of fibers aligned in the longitudinal direction of the tube, for example, may be alternated with layers of fibers aligned in the circumferential direction. The fiber wrapped tube is inserted into a second, thick walled metal tube having an inside diameter slightly larger than the outside diameter of the fiber wrapped tube. A vacuum may be formed in the fiber wrapped region between the two metal tubes. The fiber wrapped inner tube is then expanded radially against the inside of the thick walled tube with hot isostatic pressure to consolidate the reinforcing fibers into the metal, thereby forming the fiber reinforced metal tube.

17 Claims, 1 Drawing Sheet

METHOD OF FABRICATING FIBER REINFORCED METAL TUBES

TECHNICAL FIELD

The present invention relates to methods of fabricating metallic composites and, in particular, to a method of fabricating fiber reinforced metal tubes.

BACKGROUND OF THE INVENTION

In the evolution of aerospace vehicles, particularly space vehicles and military aircraft, there has been a continuous search for new, low weight, high strength materials. Because of the extreme operating environments experienced airframes and engines, their component materials must function reliably throughout a large range of temperatures and pressures during a long lifetime. Moreover, the needs for improved system performance usually include economic demands for greater process efficiencies and reduced manufacturing costs.

High heat flux systems, such as heat exchanger panels and leading edge components of reentry vehicles, can be critical items in the safe operation of aerospace vehicles. Some of these systems use high pressure fluid filled tubes to transfer heat as rapidly as possible away from high temperature surfaces. As the performance requirements for such systems have increased, a need has developed for improved, high strength, high heat conductivity materials that can be fabricated into tubes.

Prior attempts to fabricate graphite fiber reinforced copper tubes, for example, have resulted in distortion of the copper tube assemblies and nonuniform distribution of the graphite fibers. These difficulties were determined to be associated with compressive stresses developed during forming of the graphite fiber copper tube assemblies. As a result of the compressive forces used for fiber consolidation, a fold would develop in the tube causing the fibers to gather into a distorted region of the tube. Therefore, new methods of fabrication were investigated to construct high quality fiber reinforced metal tubes with a uniform distortion of fibers.

SUMMARY OF THE INVENTION

The present invention comprises a method of fabricating metal tubes that have reinforcing fibers extending in both the longitudinal and circumferential directions or at other specified angles with respect to the axis of the tube. The method avoids the tube distortion and fiber redistribution problems that have been experienced in prior methods. Consolidation of the fibers is achieved by using tensile stresses rather than the compressive forces imposed by other methods.

In the preferred embodiment of the present invention, copper tubes are reinforced with copper coated graphite fibers. The graphite fibers provide strength and increase the thermal conductivity of the copper tubes. Fabrication starts with a thin walled, small diameter copper tube. The outside surface of the thin walled tube is wound with the copper coated graphite fibers. The fibers may be wound at various angles with respect to the axis of the tube and may be applied, for example, in alternating layers of fibers aligned substantially in the longitudinal and circumferential directions of the tube, respectively. The percent of reinforcing graphite fibers by volume can be controlled by varying the thickness of the copper coating on the fibers.

After the thin walled tube has been wrapped with fibers, it is slipped inside a relatively thick walled copper tube having an inside diameter slightly greater than the outside diameter of the fiber wrapped tube. The wall thickness ratio of the two tubes is selected so that only the small tube will expand biaxially during application of hot isostatic pressure. Full consolidation of the copper coated graphite fibers into the copper is achieved by expansion of the thin walled inner tube radially outward against the inside wall of the thick containment tube. The thick walled containment tube remains stable during expansion of the thin walled inner tube. After the hot isostatic pressure operation that forms the fiber reinforced copper tube, the inside and outside diameters of the tube may be machine finished to final dimensions.

BRIEF DESCRIPTION OF THE DRAWINGS

For a more complete understanding of the present invention and for further advantages thereof, the following Detailed Description of the Invention makes reference to the accompanying Drawings, in which.

DETAILED DESCRIPTION OF THE INVENTION

Figure 1:
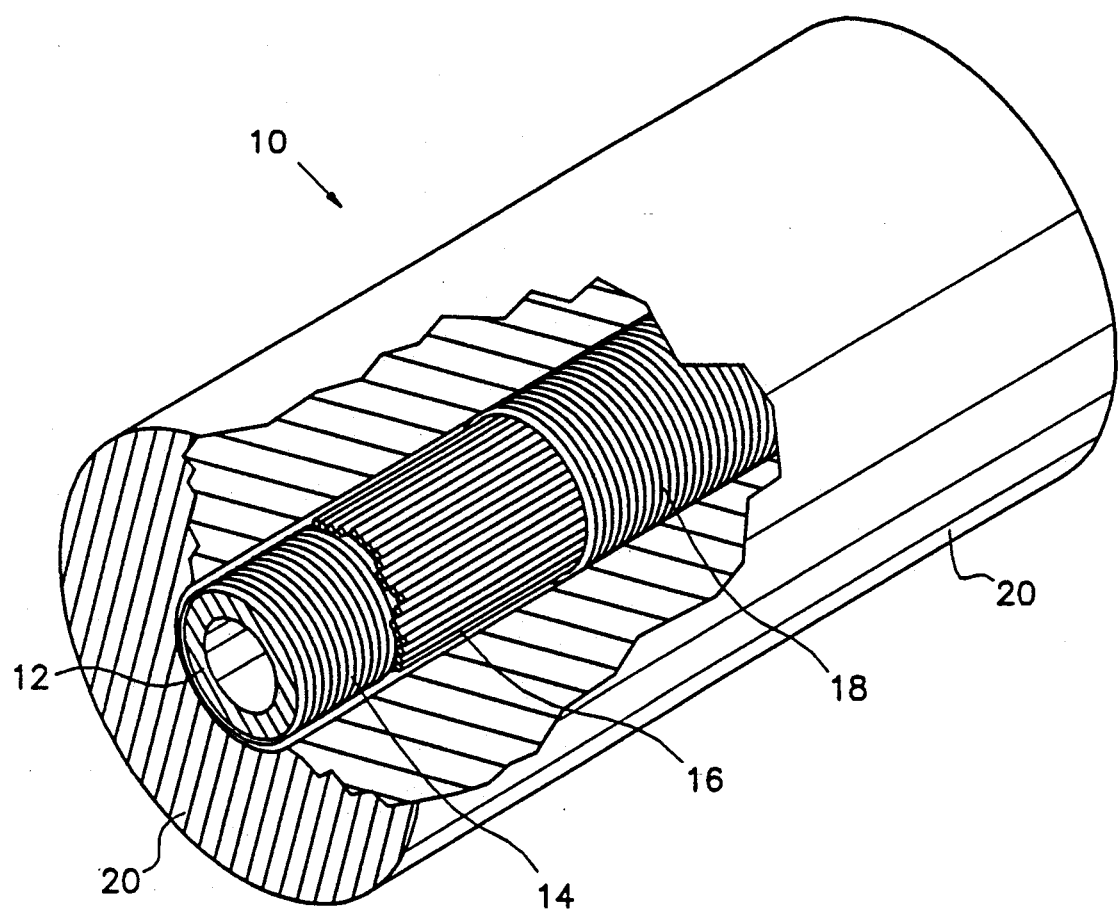
FIG. 1 is a cutaway perspective view showing the structure of a fiber reinforced metal tube produced by the method of the present invention.

Referring to FIG. 1, a fiber reinforced metal tube 10 is shown in a perspective view with a cutaway section to illustrate, by way of example and not limitation, the structure and orientation of the reinforcing fibers. The present invention comprises a method of fabricating fiber reinforced metal tube 10.

In the preferred method of the present invention, a thin walled copper tube 12 is wrapped with reinforcing fibers. Typically, tube 12 may have dimensions of 0.05" inside diameter and 0.025" wall thickness. Metals other than copper may be used in conjunction with various types of reinforcing fibers depending on the requirements specified for the finished tube. The reinforcing fibers may be applied around tube 12 in layers, for example, with alternate layers of fibers aligned substantially in the circumferential and longitudinal directions of the tube, respectively. As illustrated in FIG. 1, layer 14 may comprise copper coated graphite fibers wrapped substantially in the circumferential direction around the outside surface of copper tube 12. A second layer 16 of copper coated graphite fibers extending substantially in the longitudinal direction may be applied over layer 14. A third layer 18 of copper coated graphite fibers may be wrapped over layer 16 with the fibers oriented substantially in the circumferential direction. Additional or fewer layers of fibers may be applied in various orientations to achieve specified requirements for finished tube 10.

After thin walled copper tube 12 has been wrapped with the reinforcing fibers, tube 12 is inserted into a thick walled copper tube 20. Typical dimensions for tube 20 are 0.25" wall thickness and 0.75" outside diameter. The inside diameter of tube 20 is slightly larger than the outside diameter of fiber wrapped tube 12 so that tube 12 will slip fit into tube 20. After fiber wrapped tube 12 has been inserted into thick walled tube 20, tubes 12 and 20 may be electron beam welded around their circumferential interfaces at the ends of tube 10. Welding preparation, including use of an appropriate end cap (not shown) for tube 10, may be necessary to prevent contact of the fibers with the weld fusion zone. Electron beam welding is desirable for at least the final weld to form a vacuum in the area between tubes 12 and 20. This is recommended because any gas that remains trapped between the tubes can prevent full consolidation of the fibers into the copper.

Full consolidation of the copper coated graphite fibers into copper tube 10 is achieved by expansion of fiber wrapped tube 12 radially outward against the inside of thick walled tube 20. The minimal expansion necessary for consolidation of the fibers can be achieved by hot isostatic pressure without significant fiber breakage. The wall thickness of tube 20 is selected so that only tube 12 will expand biaxially during application of hot isostatic pressure. Thus, thick walled tube 20 remains stable during hot isostatic expansion of thin walled tube 12. After the reinforcing fibers have been consolidated into the metal, fiber reinforced tube 10 may be finished by machining both the inside and outside diameters of tube 10 to final dimensions.

Although the present invention has been described with respect to a specific embodiment thereof, various changes and modifications may be suggested to one skilled in the art. Therefore, it is intended that the present invention encompass such changes and modifications as fall within the scope of the appended claims.

We claim:

1. A method of fabricating a reinforced tube, comprising the steps of:
   providing a first metal tube having an outside surface;
   wrapping the outside surface of said first tube with a reinforcing fiber, said fiber wrapped tube having an outside diameter;
   providing a second metal tube having an inside diameter slightly larger than the outside diameter of said fiber wrapped tube;
   inserting said fiber wrapped tube into said second tube;
   expanding said fiber wrapped tube inside said second tube to consolidate said reinforcing fiber, thereby forming the reinforced tube.

2. The method of claim 1, further comprising the step of forming a vacuum in a space between said first and second tubes after inserting but before expanding said fiber wrapped tube.

3. The method of claim 2, wherein the step of wrapping comprises wrapping said first tube with a plurality of layers of reinforcing fibers.

4. The method of claim 3, wherein the step of wrapping with a plurality of layers comprises wrapping with layers of fibers aligned substantially in a longitudinal direction alternately with layers of fibers aligned substantially in a circumferential direction with respect to said first tube.

5. The method of claim 2, wherein the steps of providing tubes comprise providing a first thin walled copper tube and a second thick walled copper tube.

6. The method of claim 5, wherein the step of wrapping comprises wrapping said first thin walled copper tube with a copper coated graphite fiber.

7. The method of claim 6, wherein the step of wrapping comprises wrapping said first thin walled tube with a plurality of layers of copper coated graphite fibers.

8. The method of claim 7, wherein the step of wrapping with a plurality of layers comprises wrapping with layers of copper coated graphite fibers aligned substantially in a longitudinal direction alternately with layers of copper coated graphite fibers aligned substantially in a circumferential direction with respect to said first thin walled tube.

9. The method of claim 1, wherein the step of expanding said fiber wrapped tube comprises application of hot isostatic pressure to force said fiber wrapped tube radially outward against the inside of said second tube.

10. A method of fabricating a fiber reinforced metal tube, comprising the steps of:
    providing a thin walled metal tube having an outside surface;
    wrapping the outside surface of said thin walled tube with a reinforcing fiber, said fiber wrapped tube having an outside diameter;
    providing a second, thick walled metal tube having an inside diameter slightly larger than the outside diameter of said fiber wrapped tube;
    inserting said fiber wrapped tube into said thick walled tube;
    expanding said fiber wrapped tube inside said thick walled tube with hot isostatic pressure to consolidate said reinforcing fiber, thereby forming the fiber reinforced metal tube.

11. The method of claim 10, further comprising the step of forming a vacuum between said thin walled tube and said thick walled tube after inserting but before expanding said fiber wrapped tube.

12. The method of claim 11, wherein the step of wrapping comprises wrapping with layers of fibers aligned substantially in a longitudinal direction alternately with layers of fibers aligned substantially in a circumferential direction with respect to said thin walled tube.

13. The method of claim 12, wherein said metal tubes comprise copper tubes and said fibers comprise copper coated graphite fibers.

14. The method of claim 13, further comprising the step of forming a vacuum between the outside of said fiber wrapped tube and the inside of said thick walled tube before expanding said fiber wrapped tube with hot isostatic pressure.

15. A method of fabricating a fiber reinforced copper tube, comprising the steps of:
    providing a thin walled copper tube having an outside surface;
    wrapping the outside surface of said thin walled tube with copper coated graphite fibers, said fiber wrapped tube having an outside diameter;
    providing a second, thick walled copper tube having an inside diameter slightly larger than the outside diameter of said fiber wrapped tube;
    inserting said fiber wrapped tube into said thick walled tube;
    forming a vacuum in a space between said thin walled tube and said thick walled tube;
    expanding said fiber wrapped tube inside said thick walled tube with hot isostatic pressure to consolidate said copper coated graphite fibers, thereby forming the fiber reinforced copper tube.

16. The method of claim 15, wherein the step of wrapping comprises wrapping with layers of fibers aligned substantially in a longitudinal direction alternately with layers of fibers aligned substantially in a circumferential direction with respect to said thin walled tube.

17. The method of claim 16, further comprising the step of electron beam welding a circumferential interface between said tubes at first and second ends of said tubes to form said vacuum in the space between said tubes.

* * * * *